United States Patent
Parstorfer et al.

(10) Patent No.: US 6,876,457 B2
(45) Date of Patent: Apr. 5, 2005

(54) LIGHT GRID

(75) Inventors: Bernhard Parstorfer, München (DE); Hermann Haberer, München (DE)

(73) Assignee: Leuze lumiflex GmbH & Co., KG, Fürstenfeldbruck (DE)

( * ) Notice: Subject to any disclaimer, the term of this patent is extended or adjusted under 35 U.S.C. 154(b) by 75 days.

(21) Appl. No.: 10/624,643

(22) Filed: Jul. 23, 2003

(65) Prior Publication Data

US 2004/0124341 A1 Jul. 1, 2004

(30) Foreign Application Priority Data

Jul. 23, 2002 (DE) .......................... 102 33 258

(51) Int. Cl.$^7$ .......................... G06M 7/00; G01B 11/24
(52) U.S. Cl. .................... 356/601; 250/221; 250/559.4; 340/556; 340/825.57
(58) Field of Search .................... 356/601–624, 356/3.14, 3.16, 5.07, 5.08; 250/221, 222.2, 223 B, 559.4; 340/556–557, 825.57, 825.58; 370/82–83

(56) References Cited

U.S. PATENT DOCUMENTS 4,205,200 A * 5/1980 Parikh et al. ................ 370/472
4,755,817 A * 7/1988 Vandenbulcke et al. . 340/25.57
5,801,376 A * 9/1998 Haberl et al. ................ 250/221

FOREIGN PATENT DOCUMENTS

| DE | 19925553 A1 | * 12/2000 | ............ G01V/8/22 |
| DE | 20104248.7 | 5/2001 | |
| DE | 10046136 A1 | * 4/2002 | ............ G01V/8/20 |
| EP | 100523 A1 | * 2/1984 | ............ H04B/7/24 |

\* cited by examiner

Primary Examiner—Gregory J. Toatley, Jr.
Assistant Examiner—Sang H. Nguyen
(74) Attorney, Agent, or Firm—Venable LLp; Catherine M. Voorhees

(57) ABSTRACT

The invention relates to a light grid (1), comprising a predetermined number of pairs of transmitters (7) emitting light rays (6) and receivers (9), which form beam axes, wherein the light rays (6) emitted by the respective transmitter (7) impinge on the receiver (9) if the path of a beam axis is clear. Also provided is a control unit for controlling the transmitters (7) and for evaluating the signals received at the receiver (9) output, wherein an object detection signal can be generated in dependence on the signal received when an object interferes with at least one of the beam axes. A separate bit word is assigned to each beam axis via the control unit, wherein the beam axes can be divided into predetermined regions via at least one bit BLK of the bit words and wherein the object detection mode within this region can be preset by presetting the bit value of at least one additional bit of the bit words for the beam axes within one region.

18 Claims, 3 Drawing Sheets

Fig. 2

| BLK | BMAX | BMIN |
|-----|------|------|

Fig. 4

| BLK | BMAX | BMIN | RMAX | SEB | M1 | M2 | X |
|-----|------|------|------|-----|----|----|---|

LIGHT GRID

BACKGROUND OF THE INVENTION (1) Field of the Invention

The invention relates to a light grid including a predetermined number of pairs of transmitters that emit light rays and receivers, which together form beam axes.

(2) Description of the Related Art

A light grid of this type is known from German Reference DE 201 04 248 A1. This known light grid comprises a transmitting unit and a receiving unit, arranged at opposite sides of a monitoring range, for monitoring a two-dimensional monitoring range. The transmitting unit comprises an arrangement of side-by-side positioned transmitters that emit transmitting light rays. The receiving unit comprises a corresponding arrangement of side-by-side positioned receivers. With a clear beam path, the receivers receive the transmitting light rays emitted by the transmitters. If an object is located in the beam path, the transmitting light rays of at least one transmitter are interrupted, so that these rays no longer reach the corresponding receiver or receivers, which causes an object detection signal to be generated.

Light grids of this type are used in particular for the protection of persons. For example, light grids of this type are used to monitor safety-critical areas around machine tools, such as presses or the like. If a foreign object enters the region monitored by the light grid, the machine tool is stopped when the object detection signal is generated in the light grid, so that there is no danger to a person working in the area of the machine tool.

Depending on where the light grid is installed, the region to be monitored may also contain objects that do not endanger persons. For example, stationary posts, machine parts or the like can be arranged in the area around the machine tool and can project into the monitoring range. A response by the light grid, such as the object detection signal, would be undesirable in cases where objects that would not endanger persons are arranged around the machine.

In order to use a light grid to protect against danger in a case of this type, reference DE 201 04 248 A1 suggests blanking out those regions within the monitoring range, which contain stationary, non-dangerous objects. Objects are then detected only in those parts of the monitoring range, which are not blanked out.

At least one transmitting adapter must be attached to the transmitting unit and one receiving adapter to the receiving unit for blanking out zones within the monitoring range. For this, the transmitting light rays from at least one transmitter are coupled via the transmitting adapter into a transmitting path that extends outside of the monitoring range. At the output of the transmitting path, bridging light rays are coupled via the receiving adapter into the receiver assigned to the transmitter, so that reference light signals are generated at its output.

The disadvantage of this arrangement is that additional sensor components are required for blanking out zones in the light grid, which components must be attached to the light grid. This leads to an undesirable increase in production costs for the light grid and, additionally, leads to higher assembly costs for attaching the transmitter and receiver adapters to the light grid.

SUMMARY OF THE INVENTION

It is an object of the invention to provide a light grid that can be adapted to different uses with the lowest possible expenditure and flexibly.

The light grid according to the invention comprises a predetermined number of pairs of transmitters that emit light rays and receivers, which together form beam axes, wherein the transmitting light rays emitted by the respective transmitter impinge on the receiver if the path for a beam axis is clear, and at least one control unit for controlling the transmitter and evaluating the receiving signals present at the receiver output, wherein an object-detection signal can be generated in dependence on the signals received when an object interferes with at least one of the beam axes. In order to solve the above problems, one bit word is assigned respectively to each beam axes via the control unit so that the beam axes can be divided into predetermined regions with at least one bit BKL of the bit words. By presetting the bit values of at least one additional bit of the bit words for the beam axes within a region, the object detection mode within this region can be preset.

Thus, it is the basic object of the invention to assign bit words to the individual beam axes for configuring a light grid, wherein the functionality of the light grid can be easily preset, and changed if necessary, by presetting the bit values for the individual bits of the bit words via the control unit.

The bit words assigned to the individual beam axes may have identical word lengths. In addition, the bit words for the beam axes may have identical bit structures, meaning the same bit in the individual bit values encodes the same function for configuring the light grid.

The first bit of the bit words preferably functions to divide the beam axes into predetermined regions, within which a specific configuration of the beam axes is respectively present. The size and number of the regions can thus be easily preset by presetting the bit values for this bit.

The additional bits in each bit word function to determine the configuration of the beam axes within the respective region. In the simplest case, the configuration is such that the conventional mode of operation of a light grid can be realized within a region. It means that an object detection signal is generated if an intervening object interrupts at least one beam axis in the region.

According to a different embodiment, at least one region of the beam axes for the light grid can be specified as so-called blanking region. In a blanking region, no object detection signal is generated for an intervening object if the recorded object size, meaning the number of successive, interrupted beam axes within the blanking region, does not exceed an upper limit value and does not fall below a lower limit value. The limit values are predetermined through a suitable presetting of the bit values bits in the bit words of the beam axes. One essential advantage is the definition of non-critical objects, which are not supposed to trigger an object detection signal when interrupting the beam path of the light grid. These can be preset easily via the control unit, in which the bit values for the bit words are correspondingly fixed.

According to another embodiment, at least one region of the beam axes of the light grid can be preset as a region with reduced resolution. An object detection signal is generated in such a region only if the detected object has a predetermined minimum size. Based on the minimum object size, the intervening object must interrupt a predetermined number of successive beam axes. This minimum object size, in turn, is defined by presetting suitable values for a bit for the beam axes of this region. It is easy to preset the light grid resolution in this region by presetting these bit values.

The object within a blanking region or within a region of reduced resolution is detected with the aid of counting techniques in the control unit. For this, the number of interrupted beam axes are counted with the aid of an object counter. In particular this involves counting the number N of successive, interrupted beam axes, wherein the number N represents a measure for the recorded object size. This number is compared to reference values that are defined by the bit values for the bit words within the respectively defined region and which can be detected with counters operating parallel to the object counter in the control unit. An evaluation method of this type requires very little computing expenditure and additionally guarantees the object detection.

According to a different embodiment, so-called muting regions can be defined by presetting bit values of additional bits in the bit words. The object detection within a muting region can be deactivated in dependence on signals from external sensors. Muting regions of this type are defined to increase the availability of the light grid.

With numerous applications, particularly for systems and machines having movable components, the region monitored by the light grid only at times represents a danger zone, which must be monitored completely to detect invading objects. At predetermined intervals, the penetration of objects into specific regions of the light grid may not be critical and therefore does not have to be monitored. External sensors are normally used to determine these time intervals, e.g. for detecting the movement of components for the respective system or machine. With the aid of signals generated by the sensors, it is possible to determine in the control unit whether some regions of the light grid are not critical to safety. By presetting suitable bit values for bits of the bit words in the respective muting regions, the object detection can be deactivated at times via the control unit. Control signals are derived from the signals of external sensors also encoded with bits of the bit words in the muting region.

It is particularly advantageous that muting regions can be configured as flexibly selectable partial regions of the light grid by presetting the bit values of corresponding bits in the bit words.

BRIEF DESCRIPTION OF THE DRAWINGS

The foregoing and other features and advantages of the invention will be apparent from the following, more particular description of preferred embodiments of the invention, as illustrated in the accompanying drawings wherein:

FIG. 2 is a first example of a bit word assigned to a beam axis of the light grid according to the invention;

FIG. 4 is a second example of a bit word assigned to a beam axis of the light grid according to the invention.

DETAILED DESCRIPTION OF THE INVENTION

Figure 1:
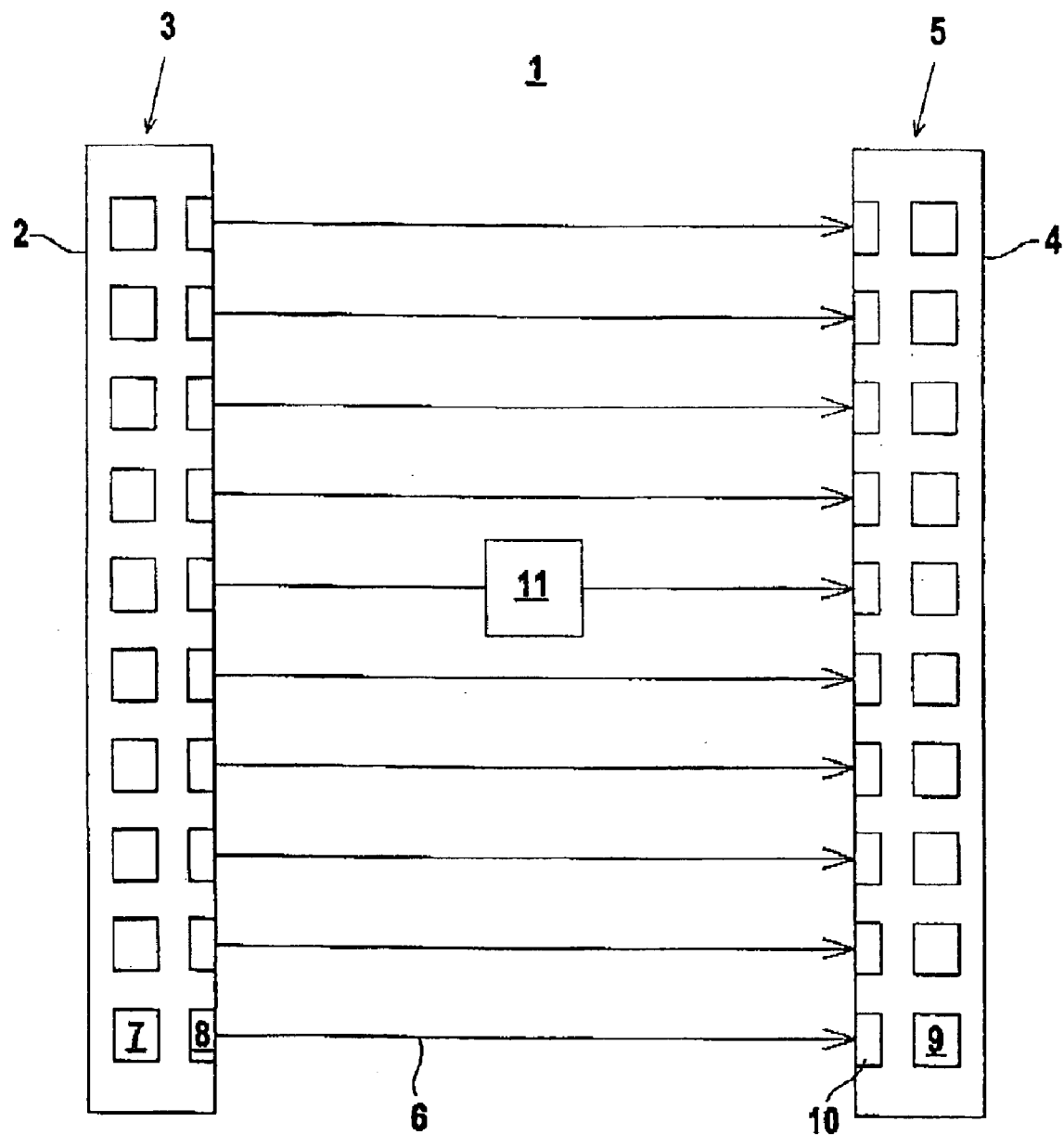
FIG. 1 is a schematic representation of a light grid with a predetermined number of beam axes.

FIG. 1 shows a light grid 1 for monitoring a region to be monitored. The light grid 1 has a transmitting unit 3 that is integrated into a first housing 2 and a receiving unit 5 that is integrated into a second housing 4.

The transmitting unit 3 comprises an arrangement of transmitters 7 that emit transmitting light rays 6. The transmitters 7 preferably include identical light-emitting diodes that are arranged side-by-side, wherein the transmitters 7 are preferably arranged equidistant. A transmitter control unit that is not shown herein triggers the transmitters 7. For the exemplary embodiment, the transmitters 7 are operated in the pulsed operation. The transmitters 7 therefore emit transmitting light pulses with a predetermined pulse-pause ratio. The individual transmitters 7 cyclically emit successive transmitting light pulses, wherein the clocking occurs via the transmitter control unit. In the process, the transmitters 7 are activated successively within one scanning operation in a predetermined scanning direction, corresponding to their sequence in the transmitting unit 3. The transmitting light pulses of the first transmitter function to synchronize the light grid 1. For this, the transmitting light pulses from the first transmitter are provided with a coding that clearly differs from the coding of the transmitting light pulses of the remaining transmitters.

A transmitting optic 8 is installed in front of each transmitter 7 for forming a beam with the transmitting light rays 6. The transmitting optics 8 are arranged in the region of the front wall of housing 2, behind an exit window that is not separately shown. The beam axes for the transmitting light rays 6 that sweep the monitoring range extend parallel to each other in the plane for the monitoring range.

The receiving unit 5 comprises side-by-side arranged receivers 9 with identical designs. Each receiver 9 preferably includes one photodiode and receivers 9 are arranged equidistant to each other. A receiving optic 10 is installed upstream of each receiver 9. According to the invention, a respective transmitter 7 of the transmitting unit 3 is positioned opposite a respective receiver 9. For the case at hand, the beam formation with the transmitting light rays 6 is selected such that with a clear beam path, the transmitting light rays 6 of each transmitter 7 respectively impinge only on the opposite-arranged receiver 9. Each transmitter 7 and the receiver 9 assigned thereto form a beam axis in the light grid 1.

The receiving signals present at the output of the receiver 9 are evaluated in a central control unit that is not shown herein. With a clear beam path of the light grid 1, the transmitting light rays 6 impinge without obstruction on the associated receiver 9 where they generate reference receiving signals that correspond to a clear beam path. In particular, the receiving signals are evaluated in the evaluation unit with a threshold value, wherein the amplitudes for the reference receiving signals are above the threshold value.

If an object 11 enters the monitoring range, it interrupts the beam path of the transmitting light rays 6 from at least one transmitter 7. In that case, the receiving signal of the associated receiver 9 is below the threshold value, meaning no reference receiving signals are recorded at this receiver 9. As a result, an object detection signal is generated in the control unit during normal operation of the light grid 1. This signal is used, for example, for shutting down a machine for which the surrounding area is monitored with the light grid 1.

According to the invention, the light grid 1 can be configured via the control unit in such a way that light grid operating modes can be realized, which differ from the normal operation.

A bit word with a preset number of bits is assigned to each beam axis of the light grid 1 for configuring the light grid 1. The structure of the bit words for the individual beam axes is identical in this case. Each bit can have bit values one and zero, wherein the bit values are allocated by the control unit.

FIG. 2 shows a first exemplary embodiment of a bit word of this type. The bit word for the present case comprises three bits BKL, BMAX and BMIN.

The light grid 1 can be divided into a predetermined number of regions by presetting suitable bit values for the bit BKL in the bit words of the beam axes. For the present case, the bit value one is assigned to a bit BLK of an initial beam axis in a region by the control unit in the scan direction of the beam axes. The bits BLK of the remaining beam axes/bit words assume the bit value zero.

Figure 3:
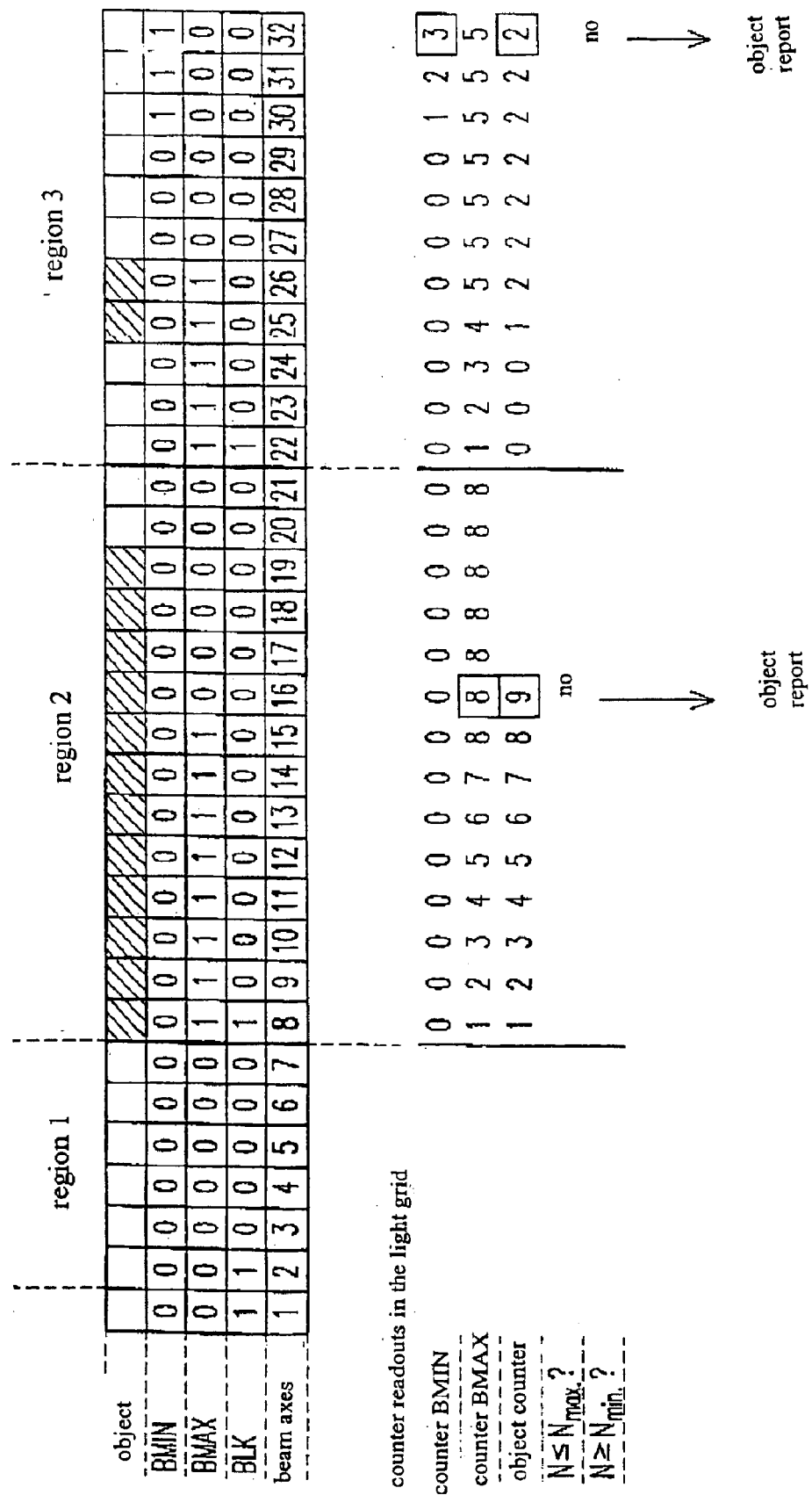
FIG. 3 is an example of a signal evaluation for a light grid configured with bit words according to FIG. 2.

A specific configuration is preset within one region via the bits BMAX and BMIN. With this configuration, a specific evaluation mode is preset within a region. FIG. 3 shows an example of such a configuration of a light grid 1 with 32 beam axes, wherein the bit words as shown in FIG. 2 are used for the configuration.

The first beam axis of light grid 1 in the scan direction is used to synchronize the light grid 1 and this beam axis by itself is considered as its own region. Thus, the first beam axis of light grid 1 is exempt from the remaining regions of the light grid 1, in which a specific configuration is preset.

Accordingly, the first beam axis forms a separate region, wherein the bit BLK of the bit word for the first beam axis assumes the value one.

A first region through which beam axes 2 to 7 extend follows the first beam axis. As described above, the bit BLK of the bit word for the second beam axis (initial beam axis of the first region) assumes the value one, while the bit values for the bit BKL of the bit words for beam axes 3 to 7 assume the value zero.

Another region, region 2, extends from the beam axis 8 to the beam axis 21 of the light grid 1, wherein this region is masked by the bit value one of the bit BLK in the bit word for beam axis 8.

Finally, a third region extends from beam axis 22 to beam axis 32 of the light grid 1, wherein this region is masked by the bit value one of the bit BLK in the bit word for beam axis 22.

An object counter is provided in the control unit for the object detection. The object counter counts the number of interrupted beam axes within a region. At the beginning of each region, the object counter is reset to the starting value zero. In particular, each object counter counts the number N of successive, interrupted beam axes that represent a measure for the respective object size of the detected object 11.

In the first region of light grid 1, a signal evaluation is realized which corresponds to the normal operation of the light grid 1. For this, the bit values for the bits BMAX and BMIN of the bit words for all beam axes of the first region are set to the value zero.

Thus, an object detection signal is generated if one of the beam axes of the first region is interrupted and the object counter assumes the value one.

As shown in FIG. 3, the third region of the light grid 1 is configured as blanking region. In this case, an object detection signal is suppressed if beam axes are interrupted, and the number N of successive, interrupted beam axes does not exceed an upper limit value $N_{max}$ and does not fall below a lower limit value $N_{min}$. It means that an object 11 that is located in the size range defined by the limit values $N_{min}$ and $N_{max}$ is classified as not critical to safety and therefore does not result in triggering an object detection signal.

The limit values $N_{max}$ and/or $N_{min}$ are defined through a suitable presetting of the bit values of bits BMAX and/or BMIN in the bit words of the beam axes of the third region.

For example, the value defining the upper limit for a permissible object size may be $N_{max}=5$. Corresponding to this number, the bit values of the bits BMAX in the bit words of the first five beam axes of the third region are set to one in the scan direction of the light grid 1 while the bit value zero is assigned to the bit BMAX of the remaining beam axes.

In the exemplary embodiment shown in FIG. 3, the value $N_{min}=3$ defines the lower limit value for the permissible object size. Corresponding to this number, the bit values of the bit BMIN for the bit words of the last three beam axes are set to one in the scan direction of the light grid 1, while the bit value zero is assigned to the bit BMIN for the remaining beam axes.

In order to detect objects according to the invention, the number of beam interruptions are counted within the third region with the object counter. Separate counters are furthermore used for counting beam axes for which the bit BMAX and/or the bit BMIN assumes the value one.

In the process, the object counter readout that indicates the actual number N of the recorded object interventions is continuously compared to the counter readout BMAX for the maximum permissible object size $N_{max}$ as well as the counter readout BMIN for the minimum permissible object size $N_{min}$.

For this, the blanking condition is continuously checked, as shown in FIG. 3:

$$N_{min} \leq N \leq N_{max}$$

As soon as this condition is not met, an object detection signal is generated.

FIG. 3 shows that an object 11 is arranged in the third region in such a way that the beam axes 25 and 26 are interrupted.

The separate counters and the object counter are reset to their starting values at the start of the third region. From the beam axis 22 to the beam axis 24, the counter readout for BMAX, which delivers the actual value $N_{max}$, is incremented upwards to the value three because the bit BMAX of the first three beam axes assumes the value one. Since the bit BMIN of these beam axes respectively assumes the value zero, the counter readout of the counter for BMIN, which provides the actual value $N_{min}$, remains set to zero. The same is true for the object counter since no object interferes with the beam axes 22 to 24. Thus, the aforementioned blanking condition is always met up to the beam axis 24.

The object 11 is recorded at beam axes 25 and 26, so that up to the beam axis 26, the object counter is incremented to the value N=2. Since the bit BMAX respectively assumes the value one for beam axes 25 and 26, the counter for BMAX is also incremented to the value $N_{max}=5$.

The counter readout for BMIN, on the other hand, remains on the value $N_{min}=0$ since the bit values for BMIN assume the value zero for the bit words of beam axes 25 and 26. As a result, the blanking condition is also met up to beam axis 26.

All counter readouts remain unchanged for beam axes 27 to 29 since the bit values for BMIN and for BMAX of each bit word for these beam axes assumes the value zero and since no object interferes with these beam axes.

The counter for BMIN is incremented upward to the value $N_{min}=3$ from beam axis 30 to beam axis 32. The counter readout for $N_{max}$ and the object counter readout for N remain unchanged.

The blanking condition is still met at beam axis 31 since the counter readout N and the value for $N_{min}$ have the same value $N_{min}=N=2$. However, starting with beam axis 32, the value $N_{min}=3$ is higher than the object counter readout N, meaning the recorded object size N=2 is smaller than the required minimum object size $N_{min}=3$. As a result, an object report is triggered at beam axis 32 by generating an object detection signal.

The maximum object size $N_{max}$ within the blanking region in general can be selected to be smaller or maximally the same as the blanking region itself. If $N_{max}$ is smaller than the size of the region, a so-called floating blanking exists, meaning the position of a non-critical object 11 that does not result in an object report can vary within the region. If $N_{max}$ is equal to the size of the blanking region, on the other hand, the object 11 may cover the complete blanking region, if necessary.

With the exemplary embodiment according to FIG. 3, the second region of the light grid 1 forms a region of reduced resolution between beam axes 8 and 21. Whereas in the blanking region an object 11 with a minimum size $N_{min}$ must be recorded in order to suppress an object-detection signal, no object 11 must be present in the region of reduced resolution for suppressing an object report. Rather, an object detection signal is only generated in the region of reduced resolution if an object 11 is detected therein, and the object 11 exceeds a predetermined maximum size $N_{max}$.

The maximum size $N_{max}$ may be preset analagous to the configuration of a blanking region in that only the bits BMAX of the bit words for the first $N_{max}$ beam axes of the region show the value one. In contrast to the configuration of the blanking region, the value zero is allocated to the bits BMIN of all bit words in the region.

The signal evaluation is analogous to the evaluation in the blanking region, wherein $$N \leq N_{max}$$

is checked in this case instead of the blanking condition.

FIG. 3 shows that an object 11 that interrupts the beam axes 8 to 19 of region 2 is arranged in the second region of the light grid 1. Accordingly, the object counter is continuously incremented from beam axes 8 to beam axis 19. In contrast, the counter BMAX is incremented only up to the beam axis 15 and then remains set to the maximum value $N_{max}=8$. Accordingly, the object counter readout N exceeds the value $N_{max}$ for the first time at beam axis 16, so that an object detection signal is generated.

For the region of reduced resolution it is true that the maximum object size $N_{max}$ must be smaller than the size of the region.

FIG. 4 shows another example of a bit word for configuring the beam axes of a light grid 1 according to FIG. 1. In contrast to the embodiment according to FIG. 2, the bit word for this exemplary embodiment has 8 bits. The first bit BLK of the bit word, in turn, is used for defining the light grid regions.

The bits BMAX, BMIN in turn serve to configure blanking regions. Differing from the exemplary embodiment according to FIG. 2, a separate bit RMAX is provided in the present case for configuring regions of reduced resolution.

A bit SEB for defining a muting region is furthermore provided. The generating of object detection signals can be suppressed within a muting region in dependence on signals from external sensors. For this, control signals are derived in the control unit from the signals of external sensors, wherein these control signals are encoded in the bits M1, M2 of the bit words.

Finally, the bit word has an additional bit X, which can trigger a switching signal for sounding alarm signals or the like.

A region of the light grid can also be configured simultaneously as blanking region and as region of reduced resolution with this bit word by the correct presetting of bit words for BMAX, BMIN and RMAX. It is useful in this case if the number of bit words with bit values BMAX=1 in the respective region is selected to be higher than the number of bit words with the bit values RMAX=1.

While this invention has been particularly shown and described with reference to preferred embodiments thereof, it will be understood by those skilled in the art that various changes in form and details may be made therein without departing from the spirit and scope of the invention as defined by the appended claims.

We claim:

1. A light grid comprising:
   a predetermined number of pairs of transmitters that emit light rays and receivers, said pairs of transmitters and receivers forming beam axes wherein the light rays emitted by a respective transmitter impinge on a respective receiver of a pair if the beam path for a beam axis is clear; and
   a control unit for controlling the transmitters and for evaluating the receiving signals present at the output of the receivers, wherein an object detection signal is generated in dependence on the signals received when an object interferes with at least one of the beam axes, and wherein the control unit assigns a separate bit word to each beam axis, each separate bit word including at least a first bit and a second bit, where the beam axes are divided into a number of predetermined regions via at least one first bit of the bit words, the object detection mode within a region of the number of predetermined regions being preset by selecting the bit value of at least one second bit for the bit words of the beam axes within the respective region of the number of predetermined regions.

2. The light grid according to claim 1, wherein the beam axes in a predetermined scanning direction can be activated periodically one after another via the control unit, wherein in this scanning direction a first bit of a bit word for the first beam axis of a region of the predetermined regions assumes the bit value one to indicate the beginning of a region.

3. The light grid according to claim 2, further comprising an object counter wherein for each scanning operation the number of beam axes interrupted by an intervening object are counted in the control unit with the object counter.

4. The light grid according to claim 3, wherein the object counter is reset respectively at the start of each region of the number of predetermined regions.

5. The light grid according to claim 4, wherein a size of the intervening object within a region of the number of predetermined regions is defined by a number N of successively interrupted beam axes that are counted in the control unit with the object counter and recorded within a region of the number of predetermined regions.

6. The light grid according to claim 3, wherein at least one region of the number of predetermined regions is a blanking region, within which an object of a specified size range interferes with at least one beam axis and does not trigger an object detection signal, and wherein the specified size range is preset with the second bit and a third bit of the bit words for the beam axes in the blanking region.

7. The light grid according to claim 6, wherein the second bit (BMAX) or a fourth bit (RMAX) of the bit word serves to preset a maximum object size $N_{max}$ within the at least one region of the number of predetermined regions, wherein $N_{max}$ corresponds to the maximum number of successively interrupted beam axes for which no object detection signal is triggered.

8. The light grid according to claim 7, wherein the second bit of a bit word for a beam axis in a blanking region in the scan direction, respectively assumes the bit value one only for the first $N_{max}$ bit words.

9. The light grid according to claim 8, further comprising one counter that is integrated into the control unit wherein the one counter counts the number of bit words within a respective region of the number of predetermined regions for which at least one of the second bit (BMAX), the third bit (BMIN), and the fourth bit (RMAX) assumes the bit value one, and wherein actual counter readouts for generating the object detection signal are continuously compared to the counter readout of said object counter.

10. The light grid according to claim 9, wherein an object detection signal is generated within a blanking region as soon as the counter readout of said object counter is one of higher than the counter readout for the second bit (BMAX) or higher than the counter readout for the fourth bit (RMAX) and lower than the counter readout for the third bit (BMIN).

11. The light grid according to claim 10, wherein for the bit value of the third bit (BMIN) being equal to 0, the blanking region forms a region with reduced resolution.

12. The light grid according to claim 11, wherein an object detection signal is generated within a region with reduced resolution as soon as the counter readout of said object counter is higher than the counter readout for the fourth bit (RMAX).

13. The light grid according to claim 6, wherein the third bit (BMIN) is used for presetting a minimum object size, wherein $N_{min}$ corresponds to the minimum number of successively interrupted beam axes needed so that no object detection signal is triggered above or equal to $N_{min}$.

14. The light grid according to claim 13, wherein in a blanking region in the scan direction, the third bit (BMIN) respectively assumes the bit value one only for the last $N_{min}$ bit words of the region.

15. The light grid according to claim 3, wherein at least one region of the number of predetermined regions is a region of reduced resolution, within which only interventions of an object having a predetermined or greater size result in triggering an object detection detection signal, wherein the predetermined size is greater than the number of second bits of the bit words preset with a value for the beam axes in the region of reduced resolution.

16. The light grid according to claim 15, wherein at least one region of the beam axes forms a combination region, configured as a reduced resolution and a blanking region within which an object of a specified size range interferes with at least one beam axis and does not trigger an object detection signal.

17. The light grid according to claim 1, wherein at least one region of the beam axes forms a muting region, within which the object detection can be deactivated in dependence on signals from external sensors and wherein the muting region is specified by means of an additional bit (SEB) of the bit words for the beam axes.

18. The light grid according to claim 17, wherein additional bits M1, M2 of the bit words for the beam axes can be preset for defining the muting region, wherein the bit values encode the signal states of the external sensors.

* * * * *